US009798042B2

United States Patent
Johnson et al.

(10) Patent No.: US 9,798,042 B2
(45) Date of Patent: Oct. 24, 2017

(54) SIMULATING AN INJECTION TREATMENT OF A SUBTERRANEAN ZONE

(71) Applicant: HALLIBURTON ENERGY SERVICES, INC., Houston, TX (US)

(72) Inventors: Samuel Bryant Johnson, Spring, TX (US); Harold Grayson Walters, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 853 days.

(21) Appl. No.: 13/757,052

(22) Filed: Feb. 1, 2013

(65) Prior Publication Data

US 2014/0222392 A1 Aug. 7, 2014

(51) Int. Cl.
*G01V 99/00* (2009.01)
*E21B 43/26* (2006.01)
*G01V 1/40* (2006.01)

(52) U.S. Cl.
CPC ............ *G01V 99/005* (2013.01); *E21B 43/26* (2013.01); *G01V 1/40* (2013.01); *G01V 2210/641* (2013.01); *G01V 2210/646* (2013.01)

(58) Field of Classification Search
CPC .................. G01V 99/00; G01V 99/005; G01V 2210/641; G01V 2210/646; G01V 1/40; E21B 43/26
USPC .......................................................... 703/10
See application file for complete search history.

(56) References Cited

U.S. PATENT DOCUMENTS

| | | | |
|---|---|---|---|
| 5,747,750 A | 5/1998 | Bailey et al. | |
| 5,992,519 A | 11/1999 | Ramakrishnan et al. | |
| 6,182,270 B1 | 1/2001 | Feldmann et al. | |
| 6,325,147 B1 | 12/2001 | Doerler et al. | |
| 6,389,361 B1 | 5/2002 | Geiser | |
| 6,581,685 B2 | 6/2003 | Burgess et al. | |
| 6,662,125 B2 | 12/2003 | Namiki | |
| 6,919,964 B2 | 7/2005 | Chu | |
| 7,068,568 B2 | 6/2006 | Robertsson | |
| 7,478,023 B2 | 1/2009 | Yu | |
| 7,574,338 B1 | 8/2009 | Kaul | |

(Continued)

FOREIGN PATENT DOCUMENTS

| | | |
|---|---|---|
| EP | 1 143 347 A1 | 10/2001 |
| EP | 1 467 287 A2 | 10/2004 |
| EP | 2 065 819 A2 | 6/2009 |

OTHER PUBLICATIONS

Ben, Y., et al. "Simulating Hydraulic Fracturing with Discontinuous Deformation Analysis" American Rock Mechanics Association, ARMA 12-480 (Jun. 2012).*

(Continued)

*Primary Examiner* — Jay B Hann

(74) *Attorney, Agent, or Firm* — John Wustenberg; Parker Justiss, P.C.

(57) ABSTRACT

Systems, methods, and software can be used to simulate a fracture treatment. In some aspects, a common solution vector for multiple distinct subsystem models is defined. Each subsystem model represents a distinct subsystem of an injection treatment system. Parameters of the subsystem models are updated based on the solution vector according to predefined relationships between the solution vector and the parameters of the subsystem models. The subsystem models are operated based on the solution vector and the updated parameters.

33 Claims, 7 Drawing Sheets

(56) References Cited

U.S. PATENT DOCUMENTS

| | | | |
|---|---|---|---|
| 7,610,183 B2 | 10/2009 | Danko | |
| 7,739,089 B2* | 6/2010 | Gurpinar | E21B 43/00 703/10 |
| 8,798,977 B2* | 8/2014 | Hajibeygi | E21B 43/26 703/10 |
| 9,085,957 B2* | 7/2015 | Wallace | G01V 99/00 |
| 9,085,975 B2* | 7/2015 | Abad | E21B 43/26 |
| 2002/0043370 A1 | 4/2002 | Poe | |
| 2003/0050758 A1 | 3/2003 | Soliman et al. | |
| 2003/0062159 A1 | 4/2003 | Nasr | |
| 2004/0204926 A1 | 10/2004 | Neittaanmaki et al. | |
| 2005/0229680 A1 | 10/2005 | Kfoury et al. | |
| 2007/0062273 A1 | 3/2007 | Kalfayan et al. | |
| 2007/0272407 A1 | 11/2007 | Lehman et al. | |
| 2008/0004847 A1 | 1/2008 | Bradford | |
| 2008/0103742 A1 | 5/2008 | Yu | |
| 2008/0133186 A1 | 6/2008 | Li et al. | |
| 2009/0083356 A1 | 3/2009 | Welkie | |
| 2010/0032156 A1 | 2/2010 | Petty et al. | |
| 2010/0057418 A1 | 3/2010 | Li et al. | |
| 2010/0094603 A1 | 4/2010 | Danko | |
| 2010/0224365 A1 | 9/2010 | Abad | |
| 2010/0269578 A1 | 10/2010 | Detournay et al. | |
| 2010/0305914 A1 | 12/2010 | Zhang et al. | |
| 2010/0312529 A1 | 12/2010 | Souche et al. | |
| 2011/0029293 A1 | 2/2011 | Petty et al. | |
| 2011/0120702 A1 | 5/2011 | Craig | |
| 2011/0120705 A1 | 5/2011 | Walters et al. | |
| 2011/0120706 A1 | 5/2011 | Craig | |
| 2011/0120718 A1 | 5/2011 | Craig | |
| 2011/0125471 A1 | 5/2011 | Craig et al. | |
| 2011/0125476 A1 | 5/2011 | Craig | |
| 2011/0213602 A1 | 9/2011 | Dasari | |
| 2012/0203516 A1 | 8/2012 | Hamann et al. | |
| 2013/0246032 A1* | 9/2013 | El-Bakry | G06F 17/5009 703/10 |

OTHER PUBLICATIONS

Zapata, et al. "Advances in Tightly Coupled Reservoir/Wellbore/Surface-Network Simulation" SPE Reservoir Evaluation & Engineering (2001).*

Wheeler, et al. "A Parallel Multiblock/Multidomain Approach for Reservoir Simulation" SPE (1999).*

Pan, Feng "Development and Application of a Coupled Geomechanics Model for a Parallel Compositional Reservoir Simulator" PhD, U. Texas (2009).*

Warpinski, N.R., et al., Comparison Study of Hydraulic Fracturing Models-Test Case: GRI Staged Field Experiment No. 3, SPE Production & Facilities, pp. 7-18, Feb. 1994, 12 pages.

"Fracpro software," StrataGen, Inc., 2012, 2 pages.

GOHFER® 3D Oriented Hydraulic Fracture Simulator, brochure dated 2010, 25 pages total.

Shaoul, J.R., et al., "Developing a Tool for 3D Reservoir Simulation of Hydraulically Fractured Wells," SPE Reservoir Evaluation & Engineering, pp. 50-59, Feb. 2007, 10 pages.

"StimPlan Hydraulic Fracturing Software," NSI Technologies; retrieved from the Internet: <URL: http://nsitech.com/index.php/stimplan-sfotware.html>, 2012, 2 pages.

"MFrac—3D Hydraulic Fracturing Simulator," Baker Hughes; dated 2012; retrieved from the Internet: <URL: http://www.mfrac.com/mfrac.html>, 2 pages.

Yao, Yao, et al., "Cohesive Fracture Mechanics Based Analysis to Model Ductile Rock Fracture," 44$^{th}$ US Rock Mechanics Symposium and 5$^{th}$ U.S.-Canada Rock Mechanics Symposium, Salt Lake City, UT, Jun. 27-30, 2010, 8 pages.

Shi, Gen-hua, Ph.D., "Discontinuous deformation analysis: A new numerical model for the statics and dynamics of block systems," University of California, Berkeley, 1988, 401 pages.

Xu, X.-P., et al., "Numerical Simulations of Fast Crack Growth in Brittle Solids," Division of Engineering, Brown University, Providence, RI, received Dec. 20, 1993; in revised form Mar. 29, 1994, 37 pages.

Chen, H.-Y., Teufel, L.W., and Lee, R.L.: "Coupled Fluid Flow and Geomechanics in Reservoir Study—I. Theory and Governing Equations," paper SPE 30752 prepared for presentation at the 1995 SPE Annual Technical Conference & Exhibition, Dallas, Texas, Oct. 22-25, 1995, pp. 507-519.

Osorio, J.G., Chen, H.-Y., and Teufel, L.W.: "Numerical Simulation of the Impact of Flow-Induced Geomechanical Response on the Productivity of Stress-Sensitive Reservoirs," paper SPE 51929 prepared for presentation at the 1999 SPE Reservoir Simulation Sypmosium, Houston, Texas, Feb. 14-17, 1999, 15 pgs.

Chen, H.-Y. and Teufel, L.W.: "Coupling Fluid-Flow and Geomechanics in Dual-Porosity Modeling of Naturally Fractured Reservoirs," paper SPE 38884 prepared for presentation at the 1997 SPE Annual Technical Conference and Exhibition, San Antonio, Texas, Oct. 5-8, 1997, pp. 419-433.

Chen, H.-Y. and Teufel, L.W.: "Coupling Fluid-Flow and Geomechanics in Dual-Porosity Modeling of Naturally Fractured Reservoirs—Model Description and Comparison," paper SPE 59043 prepared for presentation at the 2000 SPE International Petroleum Conference and Exhibition in Mexico, Villahermosa, Mexico, Feb. 1-3, 2000, 10 pgs.

Jing, L.:"Formulation of Discontinuous Deformation Analysis (DDA)—An Implicit Discrete Element Model for Block Systems," Engineering Geology (1998) 49, pp. 371-381.

Shi, G.-H. Block System Modeling by Discontinuous Deformation Analysis, Computational Mechanics Publications, Boston, Massachusetts (1993), 224 pages.

Couples, G.D., et al.:"Upscaling Fluid-Flow and Geomechanical Properties in Coupled Matrix+Fractures+Fluid Systems," paper SPE 79696 prepared for presentation at the 2003 SPE Reservoir Simulation Symposium, Houston, Texas, Feb. 3-5, 2003, 8 pgs.

Jing, L., Ma, Y., and Fang, Z.: "Modeling of Fluid Flow and Solid Deformation for Fractured Rocks with Discontinuous Deformation Analysis (DDA) Method," Int. J. Rock Mech. & Mining Science (2001) 38, pp. 343-355.

Lin, C.T., et al.: "Extensions of Discontinuous Deformation Analysis for Jointed Rock Masses," Inj. J. Rock Mech. Min.. Sci. & Geomech. Abstr. (1996) vol. 33, No. 7, pp. 671-693.

Bagheri, M. and Satan, A.: "Modeling of Geomechanics in Naturally Fractured Reservoirs," SPERE&E (Feb. 2008), pp. 108-118.

Ku, C.Y., "Modeling of Jointed Rock Masses Based on the Numerical Manifold Method," PhD Dissertation, University of Pittsburgh, 2001, 241 pgs.

Warpinski, N.R., Mayerhofer, M.J., Vincent, M.C. Cipolla, C.L., Lolon, E.P.: "Stimulating Unconventional Reservoirs: Maximizing Network Growth While Optimizing Fracture Conductivity," paper SPE 114173, prepared for presentation at the SPE Unconventional Reservoirs Conference, Keystone, Colorado, Feb. 10-12, 2008, 19 pgs.

Lin, J., Ku, C.; "Two-Scale Modeling of Jointed Rock Masses," International Journal of Rock Mechanics & Mining Sciences 43 (2006), pp. 426-436.

Ku, C et al., "Modeling of Jointed Rock Masses Using a Combined Equivalent-Continuum and Discrete Approach", International Journal of Rock Mechanics and Mining Sciences, vol. 41, No. 3, (2004), 6pgs.

Shi, Gen-hua, "Working Forum on Manifold Method of Material Analysis, vol. 2 the Numerical Manifold Method and Simplex Integration," Miscellaneous Paper GL-97-17, US Army Corps of Engineers Waterways Experiment Station, Sep. 1997, 188 pages.

Priest, S.D.,"Discontinuity Analysis for Rock Engineering," Chapman and Hall (1993).

Tran et al., Modelling Discrete Fracture Networks Using Neuro-Fractal—Stochastic Simulation, 2006, Journal of Engineering and Applied Sciences 1 (2), pp. 154-160.

* cited by examiner

SIMULATING AN INJECTION TREATMENT OF A SUBTERRANEAN ZONE

BACKGROUND

This specification relates to simulating an injection treatment of a subterranean zone. During a fracture treatment, fluids are pumped under high pressure into a rock formation through a well bore to fracture the formation and increase permeability and production from the formation. Applied mathematical models can be used to numerically simulate certain aspects of a fracture treatment. For example, discontinuous deformation analysis (DDA) can be used to simulate the propagation of fractures in the rock formation.

SUMMARY

In a general aspect, an injection treatment of a subterranean zone is simulated, for example, by a computer system.

In some aspects, a common solution vector for multiple distinct subsystem models is defined. Each subsystem model represents a distinct subsystem of an injection treatment system. Parameters of the multiple distinct subsystem models are updated based on the common solution vector according to predefined relationships between the solution vector and the parameters of the subsystem models. The subsystem models are operated based on the solution vector and the updated parameters.

Implementations may include one or more of the following features. The subsystem models each include governing equations for a respective subsystem of the injection treatment system. Defining a common solution vector includes numerically solving the governing equations. Solving the governing equations includes solving a system of differential algebraic equations. The common solution vector includes variables for each subsystem model and time derivatives for each of the variables.

Additionally or alternatively, these and other implementations may include one or more of the following features. The parameters for the subsystem models are updated by operation of couples that define values for the parameters of each subsystem model based on variables of other subsystem models included in the solution vector. The parameters of each subsystem model are updated based on the solution vector and without using the other subsystem models. Updating the parameters provides the subsystem models a complete data set for operation of the subsystem models.

Additionally or alternatively, these and other implementations may include one or more of the following features. The subsystem models each include governing equations for a respective subsystem of the injection treatment system. Operating the subsystem models produces residual values based on the governing equation. An updated common solution vector is calculated based on the residual values. The updated common solution vector is calculated from the residual values and the initial common solution vector according to a numerical root-finding algorithm.

Additionally or alternatively, these and other implementations may include one or more of the following features. The parameters are updated in parallel and the subsystem models are operated in parallel.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
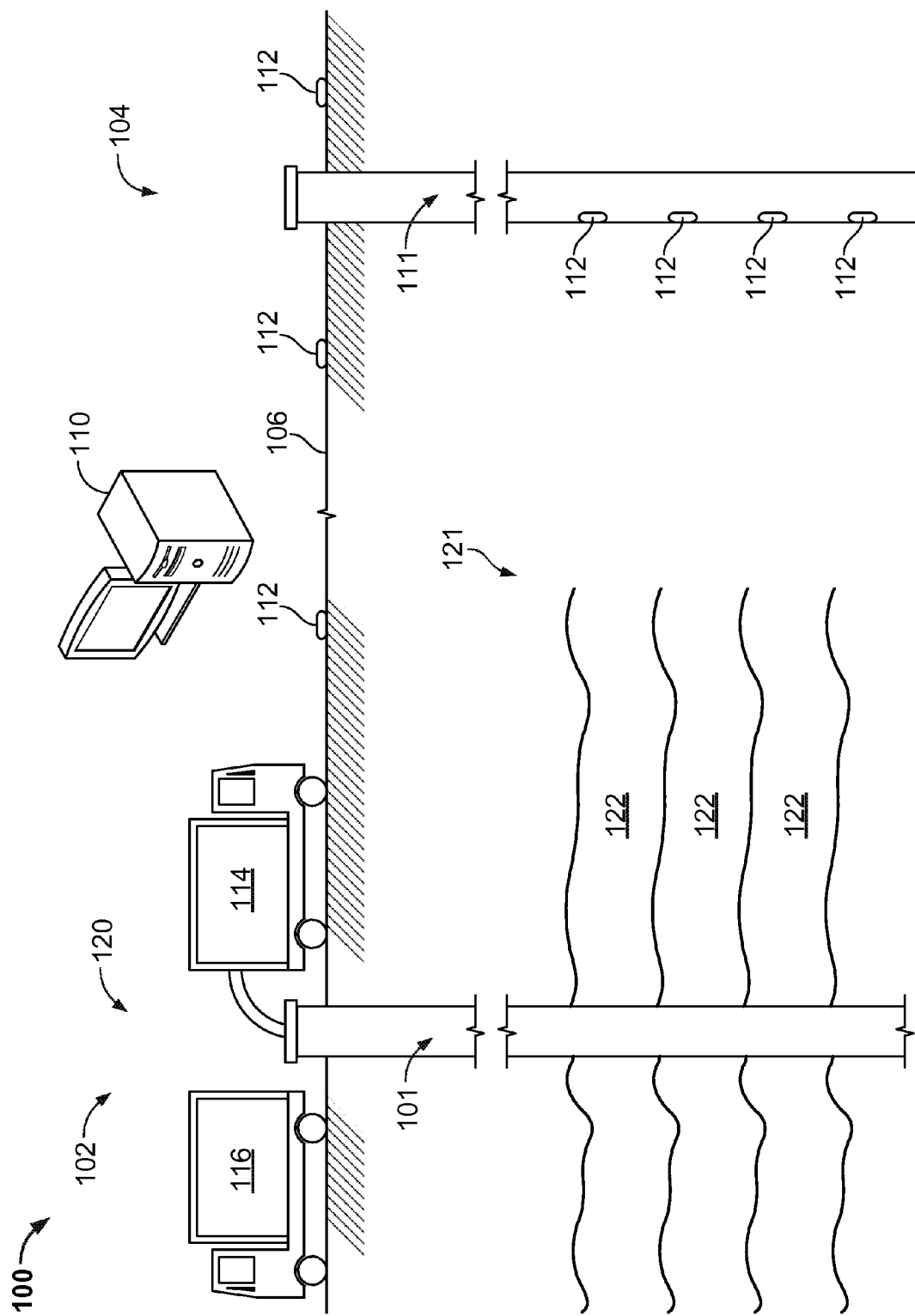
FIG. 1A is a diagram of an example well system.

In some aspects, a strategy for tightly coupling various types of applied mathematical models in a numerical injection treatment simulation is described. The applied mathematical models can represent various physical subsystems of an injection treatment system, and the behavior of the injection treatment system can be implicitly solved, for example, by solving the governing equations of the tightly coupled subsystem models. In some instances, tightly coupling disparate subsystem models includes modifying the individual models (e.g., modifying the dimensions, units, numerical formulation of the governing equations, etc.) to operate together and produce a common solution vector. Solving disparate subsystem models together to find a common solution vector may, in some instances, provide a more efficient and stable solution than some conventional techniques. For example, the common solution vector may allow all of the subsystem models to work from a common set of data. A tight coupling strategy can be used, for example, in a comprehensive injection treatment simulator that simulates the physical processes of injection treatments, or it may be used in other applications.

Producing an appropriate numerical formulation of the governing equations of an overall injection treatment simulation system may include building a global model that tightly couples the various subsystem models for various elements of the overall system, and subdividing the overall system into manageable parts, which may include various types of models, couples, other types of components, or any combination of them. In some cases, subdividing the system can provide a modular model-and-couple structure of the overall system. A model can represent the dynamics of a physical object, for example, through a collection of equations, variables and parameters, with an optional set of formulas for detecting events which represent discontinuous changes. A couple can represent the interaction between two physical objects or one physical object and its environment. The couple can act, for example, by modifying the parameters of one or both of their models, based on the model variables, and the couple parameters. The system can be developed using other types of components and data structures, or the models or couples (or both) can be configured in another manner.

In some implementations, the governing equations of an injection treatment (e.g., a fracture treatment) can include a system of partial differential equations (PDEs) for the various subsystems of the injection treatment. As an example approach to solve the governing equations, the method of lines (MOL) can be used to discretize a system of PDEs and produce a system of ordinary differential equations (ODEs) or differential algebraic equations (DAEs). The resulting system of ODEs and DAEs can be solved, for example, by taking advantage of advanced software packages that have been developed for solving a system of ODE and DAE.

The example model-and-couple structure described above can be combined with a numerical solver (e.g., a DAE solver, etc.) to provide a single solution for a wide range of physical models. In some implementations, the solution to the overall system with tightly coupled models can be obtained in a fully implicit manner leading to an efficient, stable solution, rather than solving a system with loosely coupled models. For example, some conventional techniques involving loosely coupled models use an iterative procedure, where the solution to one model is obtained based on initial guesses of the other models, then the solution for each of the other models is updated in turn, and the procedure is repeated until the solution is obtained or diverges.

Some example technique for simulating an injection treatment using tightly coupled models include creating subsystem models for each physical subsystem of the injection treatment system, and creating separate structures (e.g., couples) that represent relationships between the variables of each model and the parameters of other models. The simulation can proceed, for example, by defining a common solution vector from the subsystem models; updating the parameters of all subsystem models based on the common solution vector according to the predefined relationships (e.g., the couples); calculating residual values of the subsystem models based on the common solution vector and the updated parameters; and refining the common solution vector based on the residual values. The parameters of each subsystem model can be updated from the common solution vector using the pre-defined relationships, without using other subsystem models. As a result, the simulation technique can, in some instances, reduce error accumulation, unstable solutions, or reliability problems caused by explicit solutions returned by loosely coupled systems.

In some implementations, the techniques described here can provide one or more advantages. Tightly coupled models may, in some cases, provide better computational efficiency, simplify the evaluation of convergence conditions, or provide other advantages, for example, in a system represented by a large number of models or stiff systems of equations. Better solutions may be obtained, or a solution may be obtained were conventional techniques could not produce a solution. The simulation system can be designed in a modular fashion that allows for both customization and backward compatibility. The system solution can be efficiently parallelized, for example, without the need to parallelize the individual models, or without the need for expertise in parallel computing by individual model developers. The simulation system can be designed to reduce memory requirements through a matrix free approach. Any combination of these or other advantages may be achieved.

FIG. 1A shows a schematic diagram of an example well system 100 with a computing subsystem 110. The example well system 100 includes a treatment well 102 and an observation well 104. The observation well 104 can be located remotely from the treatment well 102, near the treatment well 102, or at any suitable location. The well system 100 can include one or more additional treatment wells, observation wells, or other types of wells. The computing subsystem 110 can include one or more computing devices or systems located at the treatment well 102, at the observation well 104, or in other locations. The computing subsystem 110 or any of its components can be located apart from the other components shown in FIG. 1A. For example, the computing subsystem 110 can be located at a data processing center, a computing facility, or another suitable location. The well system 100 can include additional or different features, and the features of the well system can be arranged as shown in FIG. 1A or in any other suitable configuration.

The example treatment well 102 includes a well bore 101 in a subterranean zone 121 beneath the surface 106. The subterranean zone 121 can include one or less than one rock formation, or the subterranean zone 121 can include more than one rock formation. In the example shown in FIG. 1A, the subterranean zone 121 includes various subsurface layers 122. The subsurface layers 122 can be defined by geological or other properties of the subterranean zone 121. For example, each of the subsurface layers 122 can correspond to a particular lithology, a particular fluid content, a particular stress or pressure profile, or any other suitable characteristic. In some instances, one or more of the subsurface layers 122 can be a fluid reservoir that contains hydrocarbons or other types of fluids. The subterranean zone 121 may include any suitable rock formation. For example, one or more of the subsurface layers 122 can include sandstone, carbonate materials, shale, coal, mudstone, granite, or other materials.

The subterranean zone 121 can include a fracture network that extends through one or more of the subsurface layers 122. The fracture network can define multiple rock blocks in one or more of the rock formations in the subterranean zone 121. The rock blocks can range in size from centimeters, or smaller, to hundreds of meters, or larger. The rock blocks can be defined by natural fractures, induced (i.e., human-created) fractures, other types of fractures or any combination of them.

The example treatment well 102 includes an injection treatment subsystem 120, which includes instrument trucks 116, pump trucks 114, and other equipment. The injection treatment subsystem 120 can apply an injection treatment to the subterranean zone 121 through the well bore 101. The injection treatment can be a fracture treatment that fractures the subterranean zone 121. For example, the injection treatment may initiate, propagate, or open fractures in one or more of the subsurface layers 122. A fracture treatment may include a mini fracture test treatment, a regular or full fracture treatment, a follow-on fracture treatment, a re-fracture treatment, a final fracture treatment or another type of fracture treatment.

The fracture treatment can inject a treatment fluid into the subterranean zone 121 at any suitable fluid pressures and fluid flow rates. Fluids can be injected above, at or below a fracture initiation pressure, above at or below a fracture closure pressure, or at any suitable combination of these and other fluid pressures. The fracture initiation pressure for a formation is the minimum fluid injection pressure that can initiate or propagate artificial fractures in the formation. Application of a fracture treatment may or may not initiate or propagate artificial fractures in the formation. The fracture closure pressure for a formation is the minimum fluid injection pressure that can dilate existing fractures in the subterranean formation. Application of a fracture treatment may or may not dilate natural or artificial fractures in the formation.

A fracture treatment can be applied by any appropriate system, using any suitable technique. The pump trucks 114 may include mobile vehicles, immobile installations, skids, hoses, tubes, fluid tanks or reservoirs, pumps, valves, or other suitable structures and equipment. In some cases, the pump trucks 114 are coupled to a working string disposed in the well bore 101. During operation, the pump trucks 114 can pump fluid through the working string and into the subterranean zone 121. The pumped fluid can include a pad, proppants, a flush fluid, additives, or other materials.

A fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single well bore, multiple fluid injection locations in multiple different well bores, or combinations of these. Moreover, the fracture treatment can inject fluid through any suitable type of well bore, such as, for example, vertical well bores, slant well bores, horizontal well bores, curved well bores, or any combination of these and others.

A fracture treatment can be controlled by any appropriate system, using any suitable technique. The instrument trucks 116 can include mobile vehicles, immobile installations, or other suitable structures. The instrument trucks 116 can include an injection control system that monitors and controls the fracture treatment applied by the injection treatment subsystem 120. In some implementations, the injection control system can communicate with other equipment to monitor and control the injection treatment. For example, the instrument trucks 116 may communicate with the pump truck 114, subsurface instruments, and monitoring equipment.

The observation well 104 shown in FIG. 1A includes a well bore 111 in a subterranean region beneath the surface 106. The observation well 104 includes sensors 112 and other equipment that can be used to detect microseismic information. The sensors 112 may include geophones or other types of listening equipment. The sensors 112 can be located at a variety of positions in the well system 100. In FIG. 1A, sensors 112 are installed at the surface 106 and beneath the surface 106 in the well bore 111. Additionally or alternatively, sensors may be positioned in other locations above or below the surface 106, in other locations within the well bore 111, or within another well bore. The observation well 104 may include additional equipment (e.g., working string, packers, casing, or other equipment) not shown in FIG. 1A. In some implementations, microseismic data are detected by sensors installed in the treatment well 102 or at the surface 106, without use of an observation well.

In some cases, all or part of the computing subsystem 110 can be contained in a technical command center at the well site, in a real-time operations center at a remote location, in another type of location, or any suitable combination of these. The well system 100 and the computing subsystem 110 can include or access communication infrastructure. For example, well system 100 can include multiple separate communication links or a network of interconnected communication links. The communication links can include wired or wireless communications systems. For example, the sensors 112 may communicate with the instrument trucks 116 or the computing subsystem 110 through wired or wireless links or networks, or the instrument trucks 116 may communicate with the computing subsystem 110 through wired or wireless links or networks. The communication links can include a public data network, a private data network, satellite links, dedicated communication channels, telecommunication links, or combinations of these and other communication links.

The computing subsystem 110 can simulate application of the fracture treatments to the subterranean formation through one or more well bores. For example, the computing subsystem 110 can simulate and predict fracture initialization and propagation during fracture treatments applied through the well bore 101. The simulation may rely on a fracture simulation system that can reflect the actual physical process of fracture treatments. The computing subsystem 110 can design or modify fracture treatments based on the simulations. For example, the computing subsystem 110 may calculate, select, or optimize fracture treatment parameters for initialization, propagation, or opening fractures in one or more of the subsurface layers 122.

Some of the techniques and operations described herein may be implemented by a computing subsystem configured to provide the functionality described. In various embodiments, a computing device may include any of various types of devices, including, but not limited to, personal computer systems, desktop computers, laptops, notebooks, mainframe computer systems, handheld computers, workstations, tablets, application servers, storage devices, or any type of computing or electronic device.

Figure 1B:
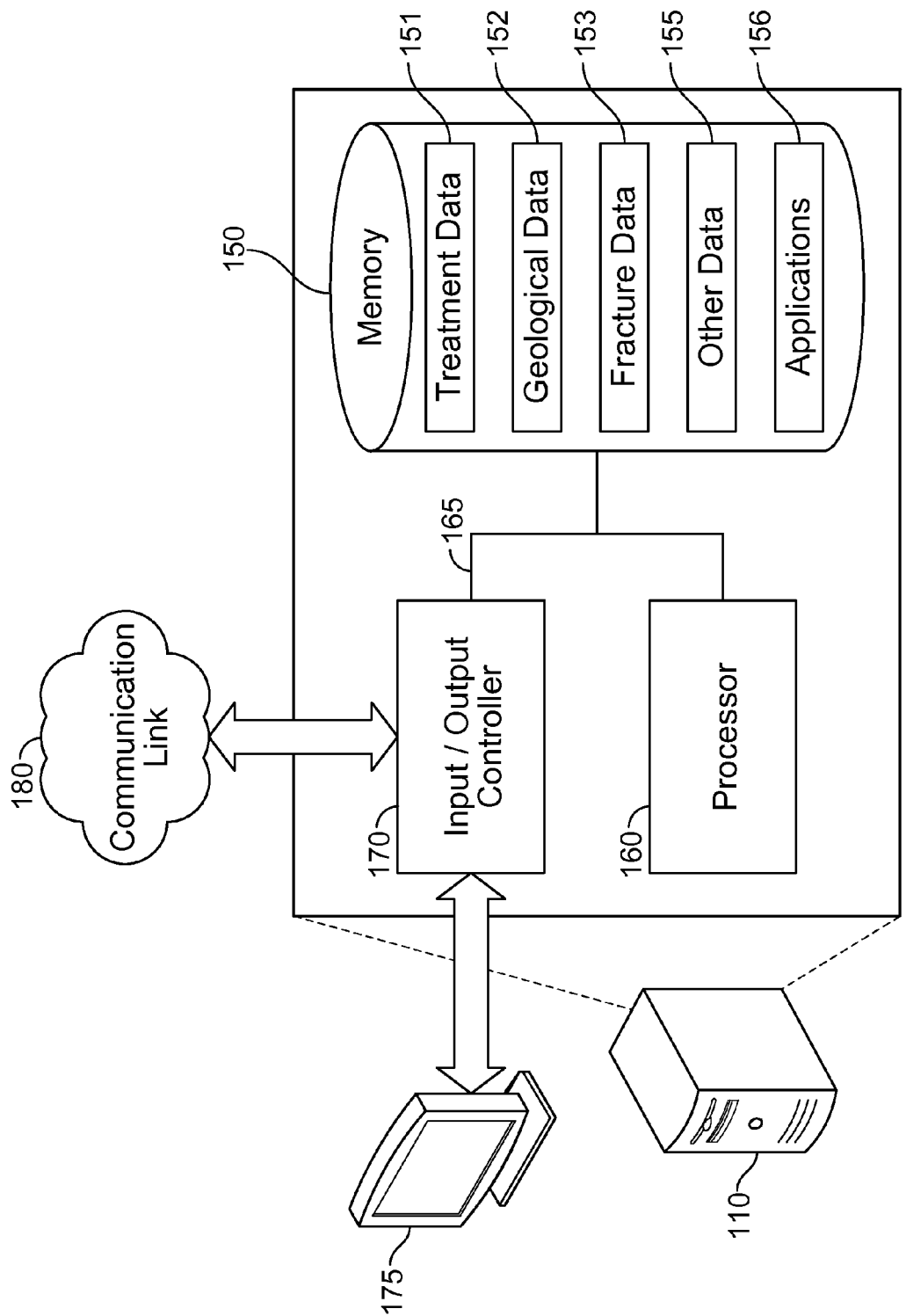
FIG. 1B is a diagram of the example computing subsystem 110 of FIG. 1A.

FIG. 1B is a diagram of the example computing subsystem 110 of FIG. 1A. The example computing subsystem 110 can be located at or near one or more wells of the well system 100 or at a remote location. All or part of the computing subsystem 110 may operate independent of the well system 100 or independent of any of the other components shown in FIG. 1A. The example computing subsystem 110 includes a processor 160, a memory 150, and input/output controllers 170 communicably coupled by a bus 165. The memory can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). In some examples, the input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 1B, the example memory 150 includes treatment data 151, geological data 152, fracture data 153, other data 155, and applications 156. In some implementations, a memory of a computing device includes additional or different information.

The treatment data 151 can include information on fracture treatment plans. For example the treatment data 151 can indicate a pumping schedule, parameters of a previous injection treatment, parameters of a future injection treatment, or parameters of a proposed injection treatment. Such parameters may include information on flow rates, flow volumes, slurry concentrations, fluid compositions, injection locations, injection times, or other parameters. The treatment data 151 can include treatment parameters that have been optimized or selected based on numerical simulations of complex fracture propagation.

The geological data 152 can include information on the geological properties of the subterranean zone 121. For example, the geological data 152 may include information on the subsurface layers 122, information on the well bores 101, 111, or information on other attributes of the subterranean zone 121. In some cases, the geological data 152 includes information on the lithology, fluid content, stress profile, pressure profile, spatial extent, or other attributes of one or more rock formations in the subterranean zone. The geological data 152 can include information collected from well logs, rock samples, outcroppings, microseismic imaging, or other data sources.

The fracture data 153 can include information on fracture planes in a subterranean zone. The fracture data 153 may identify the locations, sizes, shapes, and other properties of fractures in a model of a subterranean zone. The fracture data 153 can include information on natural fractures, hydraulically-induced fractures, or any other type of discontinuity in the subterranean zone 121. The fracture data 153 can include fracture planes calculated from microseismic data or other information. For each fracture plane, the fracture data 153 can include information (e.g., strike angle, dip angle, etc.) identifying an orientation of the fracture, information identifying a shape (e.g., curvature, aperture, etc.) of the fracture, information identifying boundaries of the fracture, or any other suitable information.

The applications 156 can include software applications, scripts, programs, functions, executables, or other modules that are interpreted or executed by the processor 160. Such applications may include machine-readable instructions for performing one or more of the operations represented in FIG. 6. The applications 156 may include machine-readable instructions for generating a user interface or a plot, such as, for example, the configurations represented in FIG. 5. The applications 156 can obtain input data, such as microseismic data, geological data, or other types of input data, from the memory 150, from another local source, or from one or more remote sources (e.g., via the communication link 180). The applications 156 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 156 by executing or interpreting the software, scripts, programs, functions, executables, or other modules contained in the applications 156. The processor 160 may perform one or more of the operations represented in FIG. 6. The input data received by the processor 160 or the output data generated by the processor 160 can include any of the treatment data 151, the geological data 152, the fracture data 153, or the other data 155.

Figure 2:
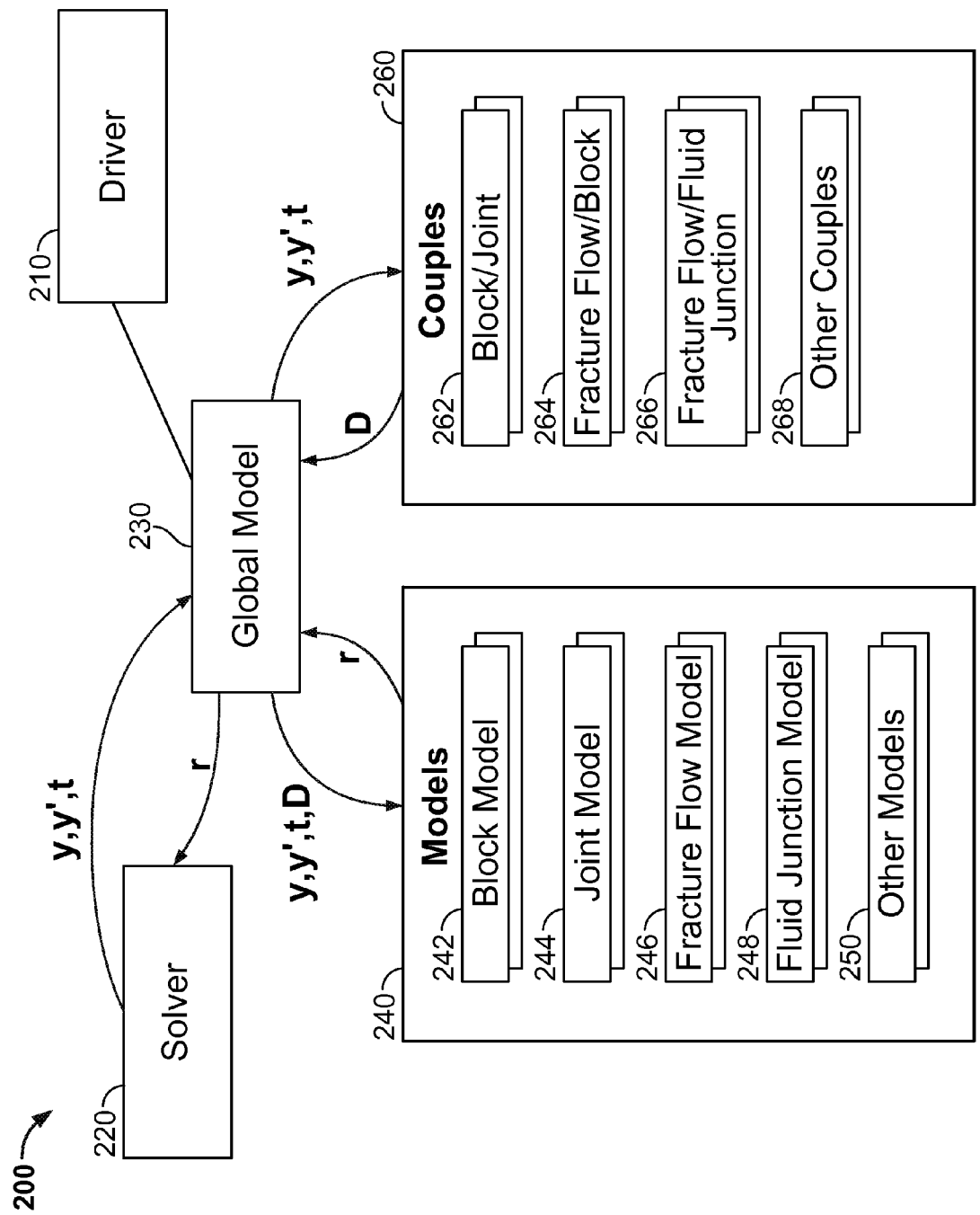
FIG. 2 is a plot showing an example simulation system architecture.

FIG. 2 is a plot showing an example simulation system architecture 200. The example simulation system architecture 200 includes a driver 210, a solver 220, a global model 230, models 240 and couples 260. The example simulation system architecture 200 can be configured to simulate an injection treatment on a computing system. For example, one or more of the applications 156 on the computing subsystem 100 shown in FIG. 1B can be implemented based on the example simulation system architecture 200 shown in FIG. 2. In some cases, the example simulation system architecture 200 can be used to implement numerical simulations based on the example configurations shown in FIGS. 3 and 4, or the simulation system architecture 200 can be used in another manner.

Some or all of the components of the example simulation system architecture 200 can exchange data (e.g., variables, parameters, etc.) with each other and collaborate in the simulation process. In some implementations, data exchange (which may include exchanging inputs, outputs, etc.) among components of the example simulation system architecture 200 may be controlled by a central control module, component interfaces, or other features of the system. Generally, a simulation system architecture can include additional or different modules or components with suitable functionality, and the features of a simulation system architecture can function as represented with respect to the example shown in FIG. 2 or in another manner.

The example driver 210 can control initialization of data structures and handle specified events in the simulation process. The driver 210 may be implemented by software, scripts, programs, functions, executables, or other types of modules. Functionality of the driver 210 can include initializing data sets (e.g., data structures) for the global model 230, the models 240, the couples 260, or any combination of them. Functionality of the driver 210 can include creating new models or couples upon detection of an event. For instance, the driver 210 may create a new block model or joint model when a new fracture is detected.

The solver 220 can include mathematical software, computer programs, a software library, or any combination of these and other types of computing resources configured to solve a mathematical problem. The solver 220 can take a problem description in a generic form and generate a solution based on a predefined algorithm or technique. The solver 220 may be a universal solver that is capable of solving any general problem that can be, for example, formalized to comply with the input requirement of the universal solver, or a dedicated solver that is specialized in solving a particular type or class of problem. Some example dedicated solvers include linear equations solvers, nonlinear equations solvers, systems of linear equations solvers, nonlinear systems solvers, systems of differential equations solvers, etc.

In some implementations, the solver 220 can include a DAE (differential algebraic equations) solver, an ODE (ordinary differential equations) solver, or a combination of these and other types of solvers. The ODE solver and the DAE solver can be used to solve system of ODEs, and DAEs, respectively. In some implementations, a wide range of DAE and ODE solvers can be used. In some instances, due to the acceptance of algebraic equations in addition to differential equations, DAE solvers can offer more flexibility. The DAE solver can be applicable, for example, to systems of implicit DAEs with a differential index of 0 or 1, where the differential index is the number of times that the whole, or a part of the system of equations need to be discretized to completely determine the equation as a system of ODEs. In some instances, the chosen solver 220 can also incorporate an event detection algorithm, consistent solution initialization, matrix-free solution with a Krylov subspace linear solver, or a combination of these and other features.

The global model 230 can manage the simulation process, or certain aspects of it. The global model 230 may access the governing equations for the injection treatment and their corresponding variables, parameters, initial conditions, boundary conditions, and the relationships among them. In some instances, the global model 230 can manage the simulation process in a manner that tightly couples multiple distinct subsystem models for various elements of an injection treatment system, which can result in a tightly coupled simulation of the overall system. The governing equations of a fracture treatment can be represented as a system of partial differential equations (PDEs) for the various subsystems of the fracture treatment. The governing equations used by the global model 230 may include systems of DAEs associated with each individual model 240.

An example strategy for solving the governing equations combines the numerical method of lines (MOL) and a differential algebraic equation (DAE) solution method. The MOL is a technique for solving partial differential equations (PDEs), where one dimension (typically time) is left in a differential form, while the other dimensions (typically space) are discretized, resulting in a system of ordinary differential equations (ODEs) or differential algebraic equations (DAEs). The MOL technique can take advantage of advanced software packages that have been developed for numerically integrating ODEs and DAEs. Additionally, if solvers with general applicability are used, PDEs with disparate physical descriptions can easily be solved in a tightly coupled manner, or even coupled to models whose canonical description is a set of ODEs or DAEs.

The example simulation system architecture 200 can subdivide the overall fracture system into manageable parts from both numerical formulation and software implementation points of view. The parts can be described as models (e.g., the models 240) and couples (e.g., the couples 260). This subdivision can allow for the easy dynamic addition or subtraction of parts to solve a particular problem at hand.

The models 240 can include any appropriate model related to the injection treatment. As an example, the models 240 for a fracture treatment can include block models 242, joint models 244, fracture flow models 246, fluid junction models 248, other models 250, or any combination of these. A model can represent the dynamics of a physical object, for example, through a collection of equations, variables and parameters. In some cases, a model can include a set of formulas for detecting events that represent discontinuous changes. Examples of models, including example block models and example joint models, that can be used to simulate an injection treatment are described in a concurrently-filed U.S. Patent Application with the application Ser. No. 13/757,306 and U.S. Pre-Grant Publication number 2014/0222393 A1, entitled "Modeling Subterranean Rock Blocks in an Injection Treatment Simulation," by inventors Jie Bai, Samuel Bryant Johnson and Harold Grayson Walters. Other types of subsystem models can be used.

An appropriate numerical formulation of the governing equations of the models may, in some cases, be derived from the physics of the subsystems represented by the models. For example, a block model 242 may represent the dynamics of a rock block with a system of equations. The block model may take force as an input parameter and return the location, orientation, stresses and strains of the block as output. As another example, a joint model 244 may represent the dynamics of a joint between two adjacent blocks. The input parameters of the joint model may include, for example, nodal forces, positions of the adjacent blocks, distances between the two blocks, and the output of the joint model may include, for example, forces towards each of the two blocks. There may be a joint model for each pair of adjacent blocks (e.g., pairs of blocks that contact each other, pairs of blocks without substantial structure separating them, etc.).

The couples 260 can include any appropriate couple related to the injection treatment. As an example, the couples 260 for a fracture treatment may include block/joint couples 262, fracture flow/block couples 264, fracture flow/fluid junction couples 266, other couples 268, or any combination of one or more of them. A couple can represent the interaction between two physical objects or one physical object and its environment. The couple can act, for example, by modifying the parameters of one or both of its associated models, based on the model variables, and the couple parameters. For instance, a block/joint couple may map a set of variables of a block model into corresponding parameters of a joint model based on pre-defined relationships specified by the block/joint couple. The joint model can take the corresponding parameters as input for further processing. Similarly, the block/joint couple may also map a set of variables of the joint model into corresponding parameters of the block model based on other pre-defined relationships specified by the block/joint couple. The block model can take the corresponding parameters as inputs.

In some aspects of operation, an example simulation procedure may start with the driver 210 initializing data structures for the global model 230, the models 240 and the couples 260. After the initialization, the solver 220 can find a solution (y, y', t) to the governing equations at each time step t, where y is an array including all variables for all models, and y' is the time derivative of y (namely, y'=dy/dt). The solver 220 may iterate until a terminating condition such as a convergence (e.g., a small enough residual) is obtained.

In some examples, at an initial time step $t_0$, the solver 220 solves for a consistent initial set (y, y', $t_0$) that satisfies initial conditions of the system. The solver 220 may solve for the consistent initial set by an initial guess or by applying consistent solution initialization criteria. Next, the time variable t is incremented by an increment $\Delta t$, and the solver 220 can solve for a solution (y, y', t+$\Delta t$) to the governing equations at the time t+$\Delta t$. The solver 220 can then pass the solution (y, y', t+$\Delta t$) to the global model 230, which can access the models 240 and the couples 260 (e.g., as described below) to compute a residual r; the global model 230 can transmit the residual r back to the solver 220. The solver 220 can then compare the residual r with a predefined tolerance value. If the residual r is less than the tolerance value, the solver may stop and return the solution (y, y', t) as an output; otherwise, the solver 220 may repeat the above processing for a better solution at a next time step until a residual less than the tolerance value is obtained. Various methods may be adopted by the solver 220 to find a better solution that reduces the residual. In some implementations, a numerical root-finding algorithm (e.g., the Newton-Raphson method or similar techniques) can be used, for example, to iteratively obtain a better solution to the overall system.

The calculation procedure associated with the global model 230 can be implemented by accessing the models 240 and the couples 260. For example, the global model 230 may control data flow (e.g., y, y', t) between the models 240 and the couples 260. The calculation procedure can be performed at each time step t with a current solution (y, y', t) as an input from the solver 220 and with a residual r as an output sent back to the solver 220. In some implementations, some or all operations of the calculation procedure may be performed by the solver 220 or may be performed by another calculating module. The calculation procedure executed by the global 230 model can proceed according to any suitable technique or algorithm. In some example implementations, the global model 230 uses a three-part procedure that includes: (1) model reset (pre-coupling), (2) coupling, and (3) model calculation.

At a model reset portion of the calculation procedure, any values that need to be reset in the models can be reset. For example, the model reset step can prepare variables and parameters of the models for updates according to the solution at the current time step. Data from recent calculations can be cleared from particular model parameters so that the parameters can be calculated based on an updated solution. As a specific example, nodal forces (e.g., in block models or joint models, etc.) can be reset to zero upon initializing the calculation procedure. The nodal forces may later be added up incrementally for a current solution to produce a different output force than at a previous time step due to, for example, movements of the blocks.

At the coupling portion of the calculation procedure, based on the solution (y, y', t) at the current time step, each of the couples 260 can prepare appropriate parameters for one or more of the respective models 240. For example, upon the receipt of (y, y', t) from the solver 220, the global model 230 may pass (y, y', t) to the couples 260. The couples 260 can prepare an array of data sets D based on the current (y, y', t). The array of date sets D can include respective data sets for each of the models 240. The data set for a model may contain corresponding parameters values or variable values for the model. In some implementations, a couple can prepare a data set for a first model that it couples by receiving variables from a second model and mapping the variables into corresponding parameters of the first model. The data sets for one or more models can be collected as the array of data sets D and sent back to the global model 230. The global model 230 can then pass the current (y, y', t) as well as the array of data sets D to the models 240.

At the model calculation step, the models 240 can be calculated based on the appropriate subset of the variables y, y', and t and parameters D received from the global model 230. The model calculation can include one or more of a residual calculation, event detection, or the application or evaluation of a preconditioner. The model calculation for individual models may be identical, similar, or different.

Residual calculation can include computation of imbalance between two sides of a system of equations based on the current y, y', t, and D. For example, a residual may be calculated as the difference between the two sides of a system of the governing equations in a model after substituting the current y, y', t, and D into the system of equations. In some implementations, one or more of the models 240 may calculate residuals based on their corresponding systems of equations. The residual calculations of the one or more models may be performed independently or jointly. In some instances, the calculated residuals of the one or more models may be collected as an array and represented by the residual r. The residual r can be sent to the global model 230 and later sent to the solver 220, where another solution may be calculated based on the residual r.

Event detection can include monitoring one or more of the variables or parameters of the models, identifying changes (e.g., discontinuous changes) of the monitored variables, or detecting new elements generated during the injection treatment. As an example, fracture growth may be detected where the stress of the fracture is observed to change from a negative value to a positive value. As another example, a new block may be detected where a new fracture is identified. Such changes and other types of conditions may be collectively referred to as events. In some implementations, event detection can be implemented by a solver that is equipped with an event detection algorithm. In some implementations, some or all of the detected events can be sent to the driver 210 so that the driver 210 can create new models or couples (or both) based on the detected events.

A preconditioner can transform a system of linear equations into another form (preconditioned form), such as, for example, a form that may be easier or more efficient to solve. In some instances, the preconditioner can cast all equations in single unit system to assure convergence. The preconditioner may be evaluated by approximating the inverse of system of linear equations. Applying the preconditioner may include, for example, multiplying the preconditioner in a system of linear equations. In some implementations, the evaluation or application of the preconditioner can be implemented by a solver that can provide a matrix-free solution with a Krylov subspace linear solver.

In some implementations, the calculation procedure can be made highly parallelizable, for example, by a modular formulation of the overall system that decouples the global model 230 into the set of models 240 and the set of couples 260. For example, in some instances, the model reset and calculation steps can be completely independent in each model and can be carried-out concurrently, where the interdependence or communication complexity is encapsulated in the coupling step.

Figure 3:
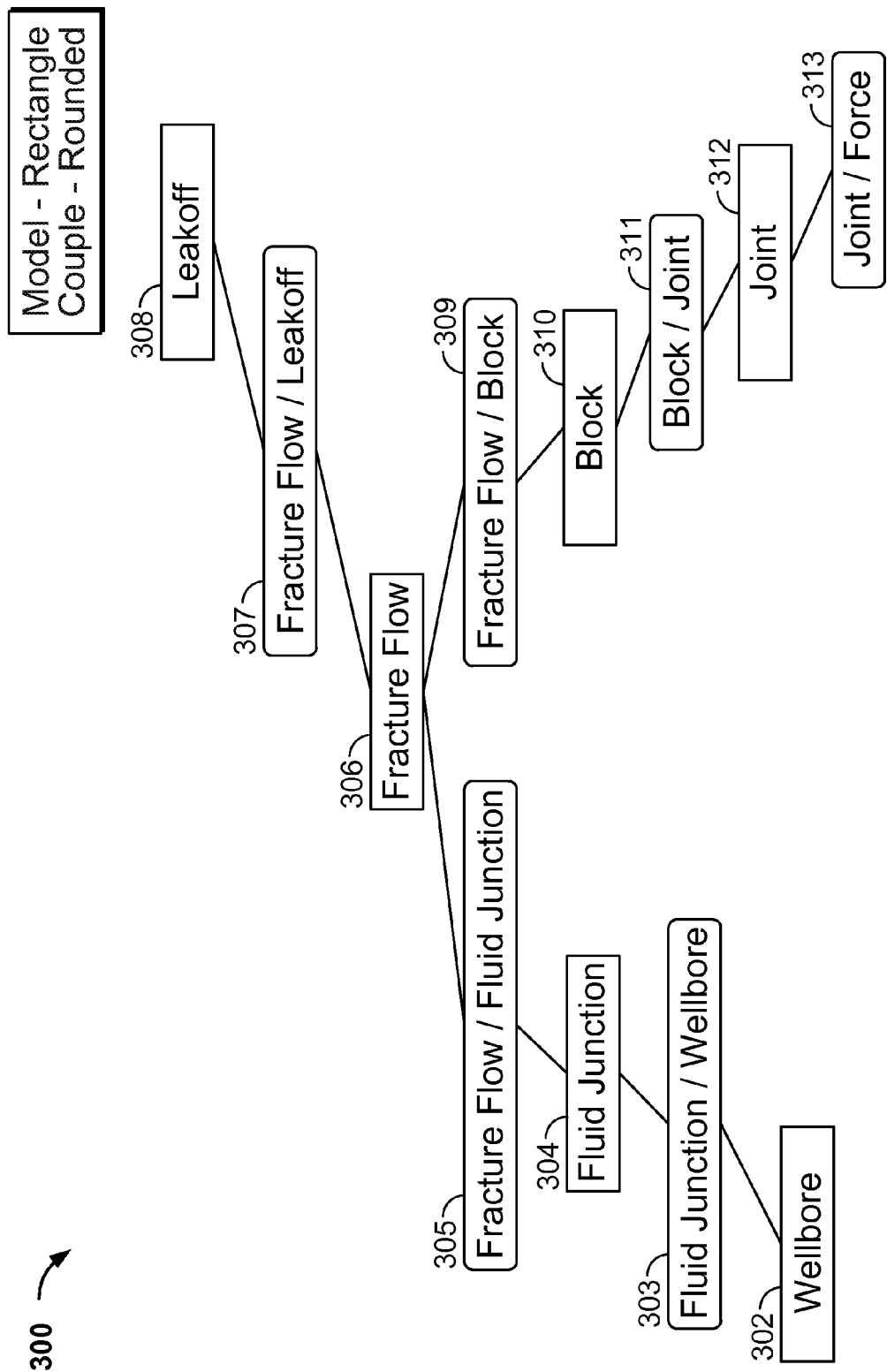
FIG. 3 is a plot showing an example configuration of an example fracture simulation system.

FIG. 3 is a plot showing an example configuration 300 of an example fracture simulation system. As shown in FIG. 3, some example fracture simulation systems can be represented by a modular configuration 300 that includes a number of models and couples. The models can, for example, describe fluid and solid mechanics of a fracture treatment system. The illustrated example configuration 300 includes a wellbore model 302, a fluid junction model 304, a fracture flow model 306, a leakoff model 308, a block model 310 and a joint model 312. Relationships between the parameters and variables of disparate models can be represented by couples. The example shown in FIG. 3 includes a fluid junction/wellbore couple 303, a fracture flow/fluid junction couple 305, a fracture flow/leakoff couple 307, a fracture flow/block couple 309, a block/joint couple 311, and a joint/force couple 313. Additional or different models or couples can be used.

Each model can represent a corresponding physical subsystem by a suitable set of governing equations that represent the dynamics of the physical system. In some examples, the fracture flow model 306 and wellbore model 302 can be based on a one-dimensional representation of incompressible momentum and mass conservation equations with a width that varies in space and time and a source term that can represent leakoff to the formation, when coupled to other models. The mass conservation equation can be differentiated in time to reduce the differential index of the equations to 1 and a second-order finite difference approximation is made for the spatial discretization. The couples can reflect physical coupling between the physical subsystems by linking the parameters for each model to the variables of other models. The boundary pressures of a fracture can be set, for example, through coupling with the fluid junction model 304. The fluid junction model 304 can be an expression of mass conservation and the junction between one or more models. The governing equations' canonical form can be an algebraic system, because of the point representation in space and no spatial discretization is necessary in some instances. However, the time derivative of the mass conservation equation can be used to reduce the differential index of the system to 1. The flow rates for the various fractures can be obtained through coupling with those models. The discontinuous deformation analysis (DDA) method can be used to describe the dynamics of deformation of rock in the formation.

Figure 4:
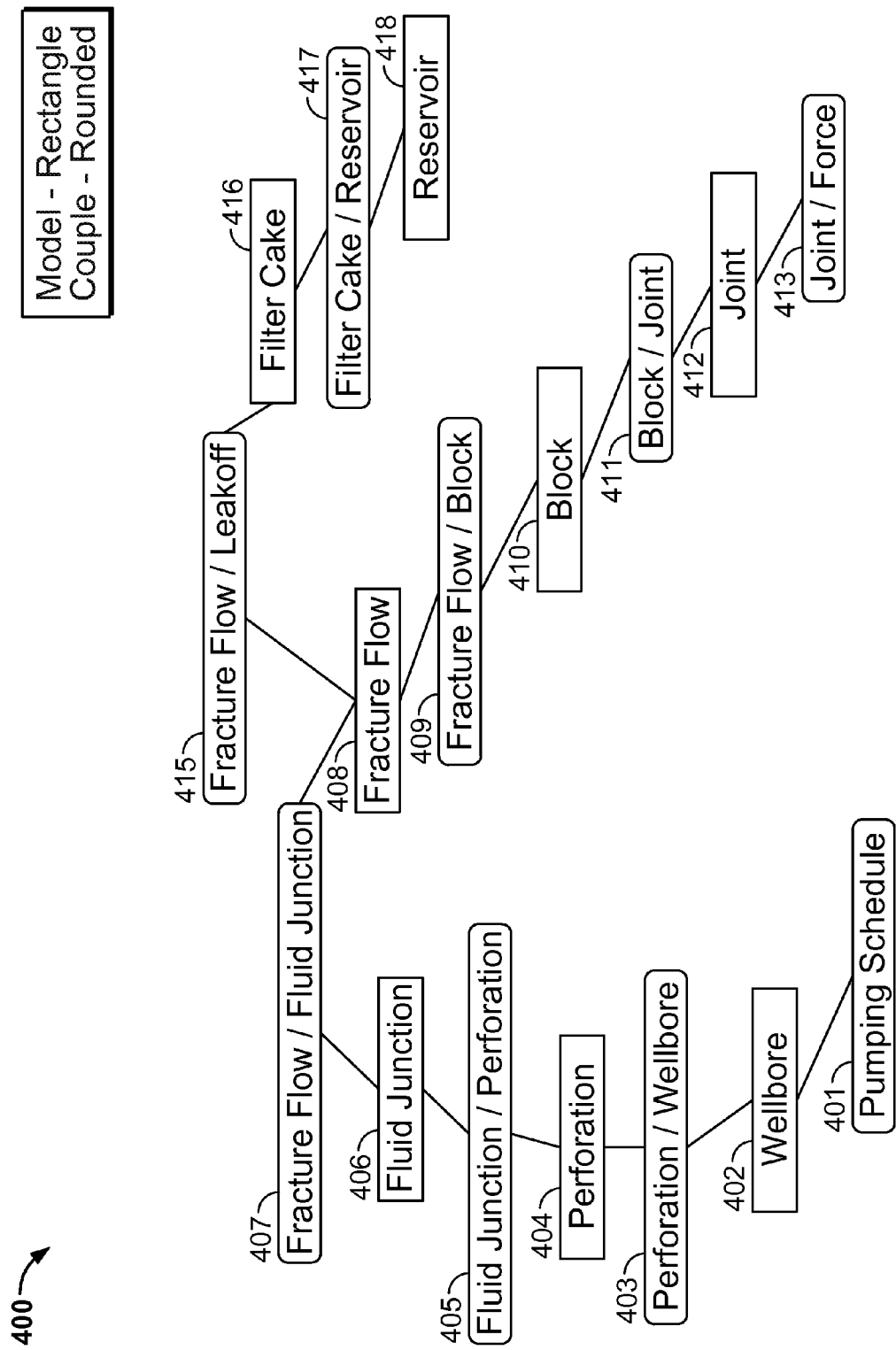
FIG. 4 is a plot showing another example configuration of an example fracture simulation system.

FIG. 4 is a plot showing another example configuration 400 of an example fracture simulation. The example configuration 400 includes additional complexity, as represented by the additional models and couples. In some aspects, the example configuration 300 in FIG. 3 can represent an earlier and simpler configuration of a fracture simulation system while the example configuration 400 in FIG. 4 can be a later and more comprehensive configuration of the fracture simulation system. Other types of modifications can be made to the simulation system.

In the example shown in FIG. 4, in addition to a wellbore model 402, a fluid junction model 406, a fracture flow model 408, a block model 410 and a joint model 412, the example configuration 400 includes a perforation model 404, a filter cake model 416, and a reservoir model 418. Accordingly, in addition to a fracture flow/fluid junction couple 407, a fracture flow/block couple 409, a block/joint couple 411, and a joint/force 413, the example configuration 400 includes a perforation/wellbore couple 403 between the wellbore model 402 and the perforation model 404, a fluid junction/perforation couple 405 between the perforation model 404 and the fluid junction model 402, and a filter cake/reservoir couple 417 between the filter cake model 416 and the reservoir model 418. The wellbore model 402 is also coupled with a pumping schedule couple 401 that can provide parameters to the wellbore model 402 related to fracture treatment. The parameters may include pumping schedule, fracturing fluid data such as flow rates, flow volumes, slurry concentrations, fluid compositions, injection locations, injection times, or any other appropriate information.

Figure 5:
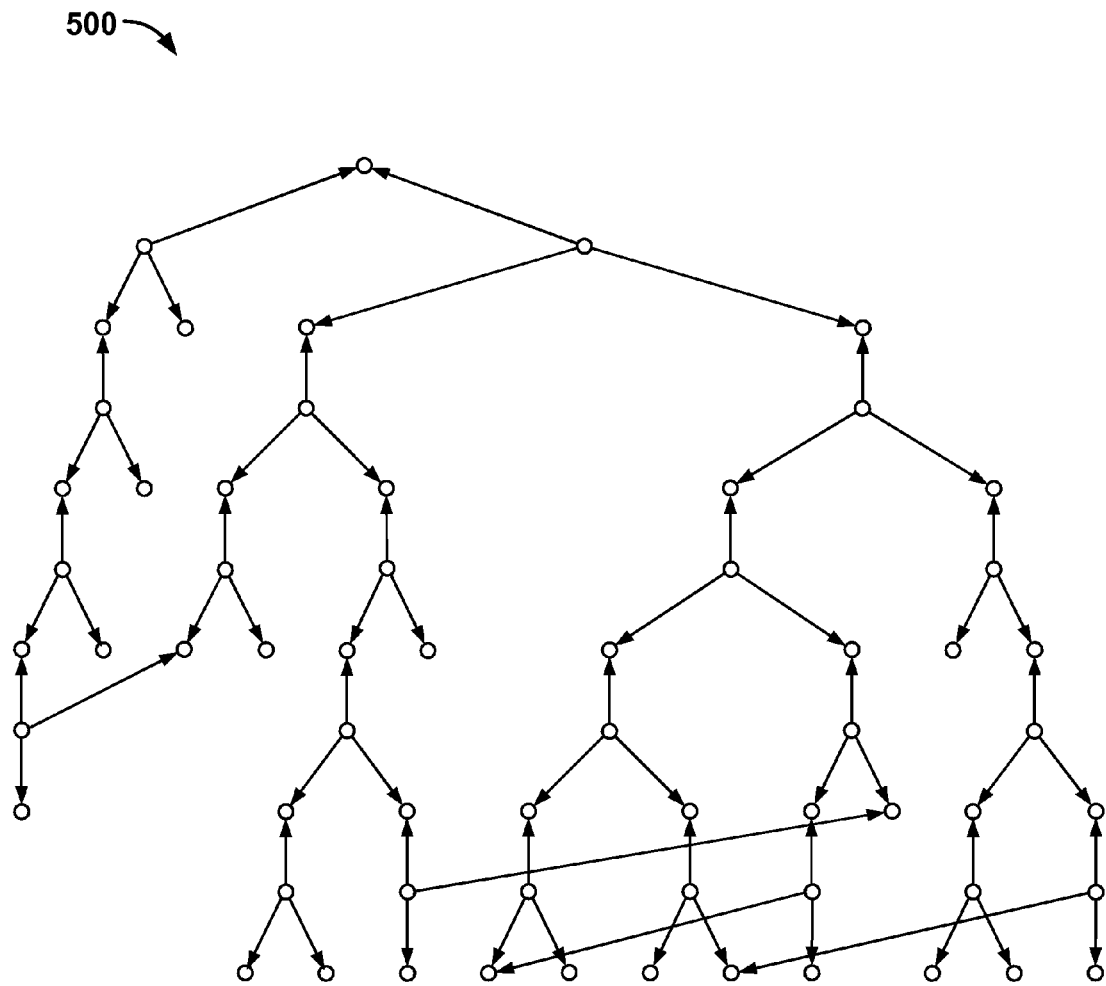
FIG. 5 is a plot showing an example graph theoretic representation of an example injection treatment simulation system.

FIG. 5 is a plot showing an example graph theoretic representation 500 of an example injection treatment simulation system. The example injection treatment simulation system may be subdivided into models and couples, where the models are represented by nodes and the couples by edges as illustrated in the example graph theoretic representation 500. In the example shown, the one-to-one structure of the couples can provide for a graph theoretic description of the coupling between the models. In some instances, the example graph theoretic representation 500 can be used to further reduce thread or process interdependence in a parallel calculation (e.g., at the model calculation step) by, for example, graph partitioning algorithms or any other appropriate technique.

The example graph theoretic representation 500 shown in FIG. 5 shows a graph view of an example injection treatment system, with each node corresponding to a subsystem model data set that represents a distinct subsystem of the overall injection treatment system. Each connection between a pair of nodes corresponds to a couple that represents a pre-defined relationship between the governing equations of the connected nodes. As an example, a node representing a fracture flow model can be connected to adjacent nodes that each represent leak-off models for various locations along the fracture. The connection between the fracture model node and each leak-off model node represents the relationship between fluid flow in the fracture and leak-off in a region of the formation. Other node/connection pairs in FIG. 5 represent other model/couple associations.

The modular model-and-couple structure (such as 300, 400, and 500 in FIGS. 3-5) of an injection treatment system can provide a systematic and effective method to calculate, analyze, design, implement, test, or optimize the injection treatment system. For example, the injection treatment system can be designed in a modular fashion that allows for both customization and backward compatibility. In some instances, the modular model-and-couple structural can allow for easy calculation, analysis, or test of the overall system, for example, by performing the calculation, analysis, or test of each model or couple individually, in parallel, or with dynamic addition or subtraction of one or more models or couples.

Figure 6:
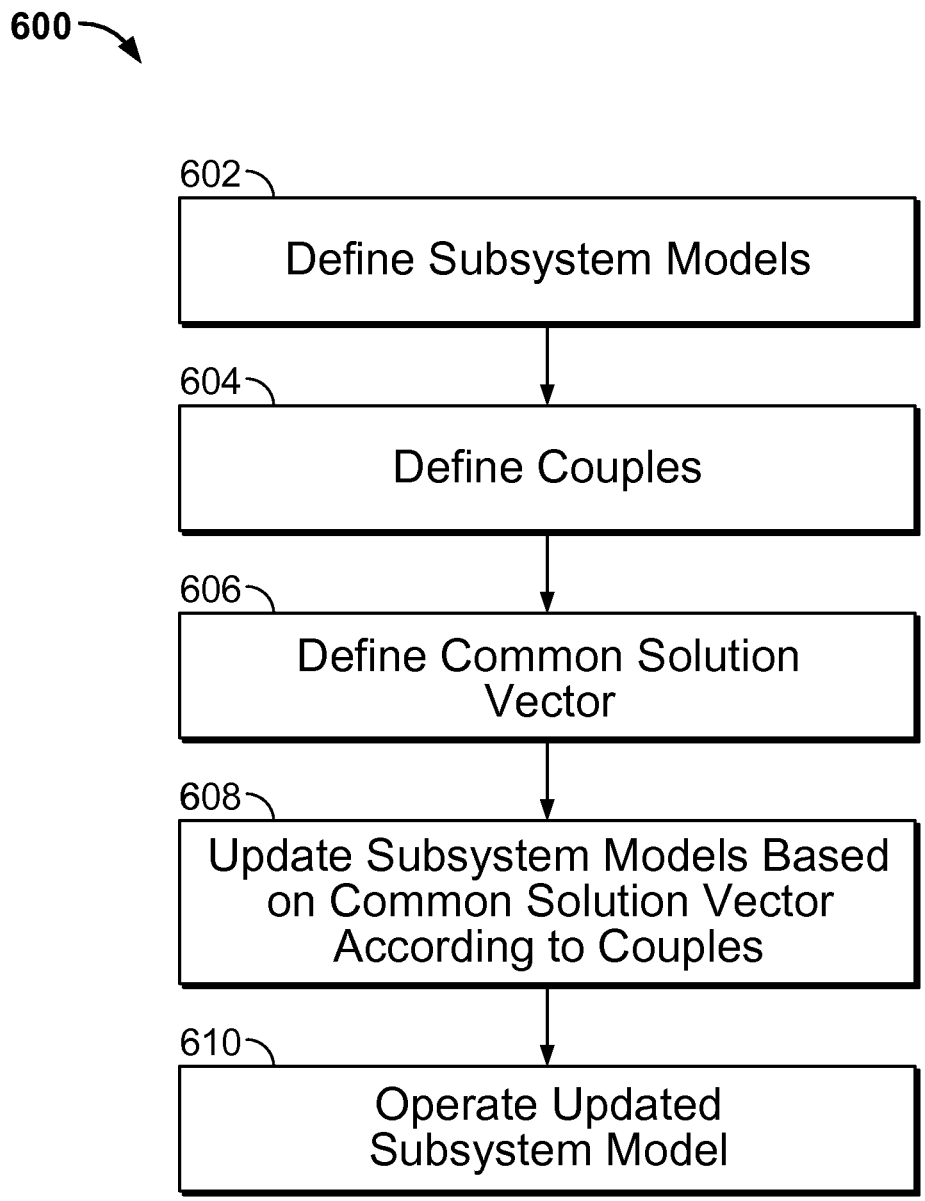
FIG. 6 is a flow chart of an example process for simulating an injection treatment.

FIG. 6 is a flow chart of an example process 600 for simulating an injection treatment. Some or all of the operations in the process 600 can be implemented by one or more computing system, such as, for example, the example computing subsystem 110 in FIG. 1B. In some implementations, the process 600 includes additional, fewer, or different operations, and the operations can be performed in the order shown or in a different order. Moreover, one or more of the individual operations or subsets of the operations in the process 600 can be performed in isolation or in other contexts.

At 602 in the example process 600, multiple distinct subsystem models are defined. Each subsystem model can represent a distinct subsystem of an injection treatment system. For example, the multiple distinct subsystem models can include some or all of the models in FIGS. 2-4, such as the block model 242, the joint model 244, the fracture flow model 246, the fluid junction model 248, etc. Other types of models can be defined. In some instances, the subsystem models can each include governing equations for a respective subsystem of the injection treatment system. The governing equations, together with respective variables, parameters, or initial and boundary conditions, can represent the dynamics of a physical object or process of the respective subsystem of the injection treatment system. In some instances, the subsystem models are tightly coupled and are included in a global model (e.g., the global model 230 in FIG. 2). The tightly coupled subsystem models may result in an overall injection treatment simulator that can, in some instances, simulate the physical process of the injection treatment.

At 604 in the example process 600, multiple couples are defined. The couples can include some or all of the example couples represented in FIGS. 2-4, such as the block/joint couple 262, the fracture flow/block couple 264, the fracture flow/fluid junction couple 266, or any other couples 268. Other types of couples can be defined. The couples can represent interactions between the distinct subsystems of an injection treatment system. In some implementations, each couple defines a relationship between a common solution vector for the subsystem models and the parameters of the subsystem models. For example, the common solution vector can include the variables for all subsystem models, the couples can provide pre-defined relationships that link the input parameters of each subsystem model to variables of other subsystem models.

At 606 in the example process 600, a common solution vector for multiple distinct subsystem models is defined. The common solution vector can include variables for each subsystem model and time derivatives for each of the variables. In some implementations, defining a common solution vector includes numerically solving the governing equations. In some implementations, solving the governing equations can include obtaining an initial data set that satisfies initial conditions of governing equations. In some instances, the governing equations can include a system ordinary differential equations (ODEs) or differential algebraic equations (DAEs). The system of ODEs or DAEs can be solved by an ODE solver or a DAE solver, as appropriate. In some cases, solving the governing equations can be performed by a solver such as the solver 220 in FIG. 2, and the common solution vector can be represented as (y, y', t).

At 608 in the example process 600, parameters of the subsystem models are updated based on the solution vector according to predefined relationships between the solution vector and the parameters of the subsystem models. In some instances, the predefined relationships are defined by the couples. The parameters for the subsystem models can be updated by operation of the couples that define values for the parameters of each subsystem model based on variables of other subsystem models included in the solution vector. The parameters of each subsystem model can be updated based on the solution vector and without using the other subsystem models. In some instances, updating the parameters can provide the subsystem models a complete data set for operation of the subsystem models. In other words, the updating the parameters at 608 allows all of the subsystem models to operate in parallel on the current solution data. As such, in some implementations, the subsystem models can operate in parallel, rather than iterating solutions between individual subsystem models.

At 610 in the example process 600, the subsystem models are operated based on the common solution vector and the updated parameters. In some implementations, operating the subsystem models includes producing residual values based on the governing equation. An updated common solution vector can be calculated based on the residual value. For example, the residual value can be used to refine the common solution vector according to a numerical solver technique. As a specific example, the updated common solution vector can be calculated from the residual values and an initial common solution vector according to the Newton-Raphson method or another numerical root-finding technique. Additionally or alternatively, operating the subsystem models can include the event detection, or the application or evaluation of a preconditioner. In some aspects, the parameters can be updated in parallel and the subsystem models can be operated in parallel.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

The invention claimed is:

1. A method of an injection treatment of a subterranean region, the method comprising:
    defining a common solution vector for multiple distinct subsystem models, each subsystem model representing a distinct subsystem of an injection treatment system of a subterranean region, wherein the multiple distinct subsystem models comprise at least a block model, a joint model, and a fracture flow model, wherein the common solution vector includes variables for each of the multiple distinct subsystem models, wherein the multiple distinct subsystems models are tightly coupled to allow for solving the multiple distinct subsystems models together to produce the common solution vector;
    updating, by a numerical root-finding technique, parameters of the subsystem models based on the common solution vector according to predefined relationships between the common solution vector and the parameters of the subsystem models, wherein updating parameters of the subsystem models based on the common solution vector comprises generating a complete data set for all the subsystem models to operate in parallel on the common solution vector without iterating solutions between individual subsystem models;
    operating, by data processing apparatus, the subsystem models based on the common solution vector and the updated parameters to perform a simulation of an injection treatment of the subterranean region; and
    performing the injection treatment of the subterranean region using the simulation.

2. The method of claim 1, wherein the subsystem models each include governing equations for a respective subsystem of the injection treatment system, and defining a common solution vector includes numerically solving the governing equations.

3. The method of claim 2, wherein solving the governing equations includes solving a system of differential algebraic equations.

4. The method of claim 1, wherein the parameters for the subsystem models are updated by operation of couples that define values for the parameters of each subsystem model based on variables of other subsystem models included in the solution vector.

5. The method of claim 1, wherein the parameters of each subsystem model are updated based on the common solution vector and without using other subsystem models.

6. The method of claim 1, wherein updating the parameters provides the subsystem models a data set for operation of the subsystem models.

7. The method of claim 1, wherein the subsystem models each include governing equations for a respective subsystem of the injection treatment system, and operating the subsystem models produces residual values based on the governing equations.

8. The method of claim 7, comprising calculating an updated common solution vector based on the residual values.

9. The method of claim 8, wherein the updated common solution vector is calculated from the residual values and an initial common solution vector according to a numerical root-finding algorithm.

10. The method of claim 1, comprising updating the parameters in parallel and operating the subsystem models in parallel.

11. The method of claim 1, wherein the common solution vector comprises variables for each subsystem model and time derivatives for each of the variables.

12. A non-transitory computer-readable medium storing instructions that, when executed by data processing apparatus, perform operations comprising:
    defining a common solution vector for multiple distinct subsystem models, each subsystem model representing a distinct subsystem of an injection treatment system of a subterranean region, wherein the multiple distinct subsystem models comprise at least a block model, a joint model, and a fracture flow model, wherein the common solution vector includes variables for each of the multiple distinct subsystem models, wherein the multiple distinct subsystems models are tightly coupled to allow for solving the multiple distinct subsystems models together to produce the common solution vector;
    updating, by a numerical root-finding technique, parameters of the subsystem models based on the common solution vector according to predefined relationships between the common solution vector and the parameters of the subsystem models, wherein updating parameters of the subsystem models based on the common solution vector comprises generating a complete data set for all the subsystem models to operate in parallel on the common solution vector without iterating solutions between individual subsystem models;

operating the subsystem models based on the common solution vector and the updated parameters to perform a simulation of an injection treatment of the subterranean region; and operating the subsystems of the injection treatment system to physically perform the injection treatment of the subterranean region using the simulation.

13. The computer-readable medium of claim 12, wherein the subsystem models each include governing equations for a respective subsystem of the injection treatment system, and defining a common solution vector includes numerically solving the governing equations.

14. The computer-readable medium of claim 13, wherein solving the governing equations includes solving a system of differential algebraic equations.

15. The computer-readable medium of claim 12, wherein the parameters for the subsystem models are updated by operation of couples that define values for the parameters of each subsystem model based on variables of other subsystem models included in the solution vector.

16. The computer-readable medium of claim 12, wherein the parameters of each subsystem model are updated based on the common solution vector and without using other subsystem models.

17. The computer-readable medium of claim 12, wherein updating the parameters provides the subsystem models a data set for operation of the subsystem models.

18. The computer-readable medium of claim 12, wherein the subsystem models each include governing equations for a respective subsystem of the injection treatment system, and operating the subsystem models produces residual values based on the governing equations.

19. The computer-readable medium of claim 18, comprising calculating an updated common solution vector based on the residual values.

20. The computer-readable medium of claim 19, wherein the updated common solution vector is calculated from the residual values and an initial common solution vector according to a numerical root-finding algorithm.

21. The computer-readable medium of claim 12, comprising updating the parameters in parallel and operating the subsystem models in parallel.

22. The computer-readable medium of claim 12, wherein the common solution vector comprises variables for each subsystem model and time derivatives for each of the variables.

23. An injection treatment system comprising one or more computers configured to perform operations, the operations including:

defining a common solution vector for multiple distinct subsystem models, each subsystem model representing a distinct subsystem of an injection treatment system of a subterranean region, wherein the multiple distinct subsystem models comprise at least a block model, a joint model, and a fracture flow model, wherein the common solution vector includes variables for each of the multiple distinct subsystem models, wherein the multiple distinct subsystems models are tightly coupled to allow for solving the multiple distinct subsystems models together to produce the common solution vector;

updating, by a numerical root-finding technique, parameters of the subsystem models based on the common solution vector according to predefined relationships between the common solution vector and the parameters of the subsystem models, wherein updating parameters of the subsystem models based on the common solution vector comprises generating a complete data set for all the subsystem models to operate in parallel on the common solution vector without iterating solutions between individual subsystem models;

operating the subsystem models based on the common solution vector and the updated parameters to perform a simulation of an injection treatment of the subterranean region; and operating the subsystems of the injection treatment system using the simulation.

24. The injection treatment system of claim 23, wherein the subsystem models each include governing equations for a respective subsystem of the injection treatment system, and defining a common solution vector includes numerically solving the governing equations.

25. The injection treatment system of claim 24, wherein solving the governing equations includes solving a system of differential algebraic equations.

26. The injection treatment system of claim 23, wherein the parameters for the subsystem models are updated by operation of couples that define values for the parameters of each subsystem model based on variables of other subsystem models included in the solution vector.

27. The injection treatment system of claim 23, wherein the parameters of each subsystem model are updated based on the common solution vector and without using other subsystem models.

28. The injection treatment system of claim 23, wherein updating the parameters provides the subsystem models a data set for operation of the subsystem models.

29. The injection treatment system of claim 23, wherein the subsystem models each include governing equations for a respective subsystem of the injection treatment system, and operating the subsystem models produces residual values based on the governing equations.

30. The injection treatment system of claim 29, the operations including calculating an updated common solution vector based on the residual values.

31. The injection treatment system of claim 30, wherein the updated common solution vector is calculated from the residual values and an initial common solution vector according to a numerical root-finding algorithm.

32. The injection treatment system of claim 23, comprising updating the parameters in parallel and operating the subsystem models in parallel.

33. The injection treatment system of claim 23, wherein the common solution vector comprises variables for each subsystem model and time derivatives for each of the variables.

* * * * *